Patented Dec. 9, 1924.

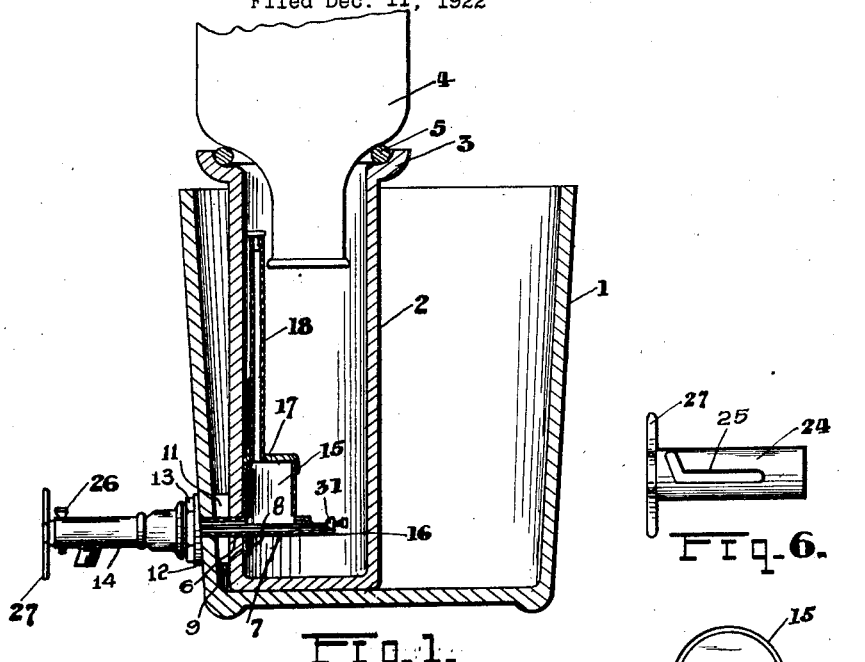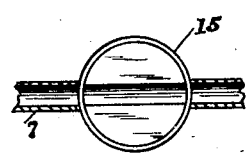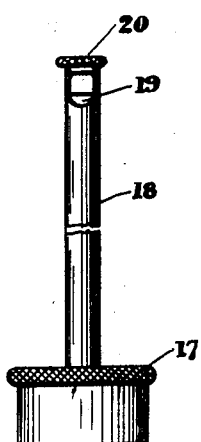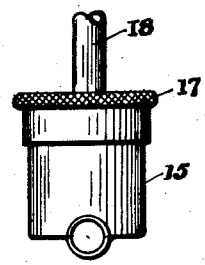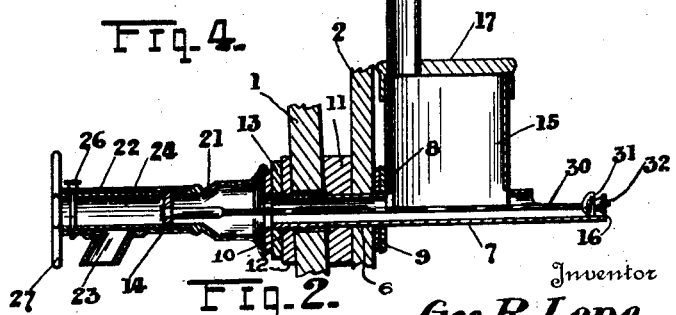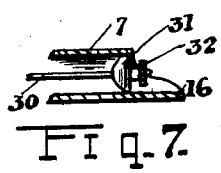

1,518,991

UNITED STATES PATENT OFFICE.

HENRY G. CORDLEY, OF GLEN RIDGE, NEW JERSEY, AND GEORGE R. LONG, OF WATERBURY, CONNECTICUT.

MEASURING DEVICE.

Application filed December 11, 1922. Serial No. 606,188.

*To all whom it may concern:*

Be it known that we, HENRY G. CORDLEY, residing at Glen Ridge, Essex County, State of New Jersey, and GEORGE R. LONG, residing at Waterbury, county of New Haven, State of Connecticut, both being citizens of the United States, have invented certain new and useful Improvements in Measuring Devices, of which the following is a specification, reference being had to the accompanying drawings, forming a part thereof.

Our invention relates to measuring devices for use in dispensing beverages or other liquids and has for its object to provide a measuring device particularly adapted for use in connection with a liquid container of the water cooler type in which the beverage to be dispensed is contained in a receptacle arranged within an ice tank and in which the beverage to be dispensed is kept at a constant level by the flow from an inverted bottle or by other means. A further object of the invention is to provide in a dispensing device of this general type measuring means which will be out of sight and will be protected from injury and from being tampered with by the inverted bottle while it is in place, and will also be protected against the entrance into it of dust or dirt. A further object of the invention is to provide a simple and at the same time effective measuring device and to provide for securing and maintaining it in place by the fewest possible parts.

With the objects above indicated and other objects hereinafter explained in view our invention consists in the construction and combination of elements hereinafter described and particularly pointed out in the claims.

Referring to the drawings:

Figure 1 is a central vertical sectional view of a liquid dispensing cooler provided with the measuring device embodying our invention.

Figure 2 is a detail sectional view similar to Figure 1 but showing the measuring device on an enlarged scale.

Figure 3 is a side view of the cover of the measuring cup and the vent tube carried by it.

Figure is a rear end view of the draw off tube and measuring cup.

Figure 5 is a top plan view of the measuring cup with cover removed.

Figure 6 is a detail view of the faucet plug.

Figure 7 is a detail sectional view showing the end of the draw off tube.

In the drawings 1 indicates an ice tank of any usual construction having arranged therein a liquid container or jar 2 having its open upper end provided with an annular seat 3 adapted to receive the neck of an inverted bottle 4 the shoulder of the bottle resting on a gasket 5. The liquid container or jar 2 has near its bottom the usual opening 6 for the tube through which its contents may be drawn off.

Through this opening 6 extends the draw off tube 7 provided within the liquid container or jar with a ring 8 between which and the inner wall of the liquid container or jar is a gasket 9. This draw off tube is of sufficient length to extend through the wall of the ice tank 1 and is screw-threaded as shown at 10. On this draw off tube between the outer face of the wall of the liquid container or jar and the inner face of the wall of the ice tank is a relatively thick gasket 11.

On the draw off tube outside the ice tank is a gasket 12. A nut 13 screwed onto the end of the draw off tube serves to draw the tube outward forcing the ring 8 against the gasket 9, compressing the gasket 11 between the liquid container or jar and the wall of the ice tank and compressing the gasket 12 against the outside of the ice tank. The draw off tube and the nut 13 thus serve to hold the liquid container or jar in position and to prevent leakage from it and from the ice tank. Secured to the nut 13 is the faucet 14.

The draw off tube extends within the liquid container or jar 2 a substantial distance and is cut away on its upper side to receive the bottom of a cup 15 which is secured to the tube and has an opening in it permitting free flow of liquid from the tube into the cup and from the cup into the tube. The inner end of the draw off tube extends beyond the bottom of the cup this end of the tube being cylindrical to receive and be closed by the valve 31. Extending rearward from this end of the tube on its lower side is a rearwardly extending guide lip 16 to support the valve when in rearward position.

On the cup 15 is a removable cover 17 which carries an upwardly extending vent tube 18 having an opening 19 in one side at its upper end and a plug 20 in its upper end to prevent anything from dropping into the vent tube. This vent tube 18 is of such length that when in position the opening 19 will be slightly above the level at which the liquid is maintained by the inverted bottle 4.

The faucet 14 is of the reciprocating plug type and is here shown as comprising an inner tube 21 carried by the nut 13 and an outer tube 22, the inner end of which fits over the outer end of the inner tube 21, the outer tube being provided with the spout 23. Within this outer tube is the reciprocating plug 24 the inner end of which is adapted to seat itself against the outer end of the inner tube 21. The plug is provided with bayonet slots 25 through which extends a pin 26 carried by the outer tube 22, and has on its outer end a hand piece 27 by which it may be rotated and reciprocated, it being understood that when turned in one direction the plug is unlocked and is then free to be drawn forward and when pushed rearward and rotated it is locked by the action of the bayonet slots 25 and the pin 26.

Extending rearward from the plug 24 through the draw off tube 7 is a rod 30 carrying on its rear end a valve 31, preferably screwthreaded onto the rod, of such diameter as to fit into and close the end of the draw off tube when the plug 24 of the faucet is drawn forward. When the plug 24 is in rearward position with its end against the seat formed by the outer end of the inner tube 21 this valve is to the rear of the end of the draw off tube, and as the operating rod 30 is supported by its own stiffness or may drop down to be supported near its rear end by the guide lip 16 at the end of the tube, the valve is thus sufficiently in rear of the open end of the tube to permit free entrance of liquid. As the plug 24 is drawn forward, after being rotated to unlock it, the valve moves forward on the lip 16 and enters the end of the draw off tube preventing inflow of liquid and also preventing outflow into the liquid container. In order that the valve may readily ride on the lip 16 it is made of a rounded conical form on its forward face. A nut 32 on the end of the operating rod serves to prevent possibility of the valve being detached.

The valve 31 is intentionally so formed as to fit somewhat loosely in the drawoff tube end, and as will be apparent, its movement is not restricted by a fixed seat. It therefore presents no obstacle to the free movement of the plug 24.

When the parts are in the position in which they are shown in Figure 1 the liquid in the liquid container or jar 2 will flow freely through the inner end of the draw off tube and through the opening in the bottom of the cup 15 filling the cup and the vent tube 18 up to the level of the liquid in the liquid container or jar, this level being determined by the mouth of the inverted bottle 4. On unlocking the plug of the faucet by means of the hand piece 27 and drawing the plug outward, the valve 31 is drawn into the rear end of the draw off tube stopping further inflow of liquid. At the same time the faucet being open the liquid contained in the cup 15 and the tube 18 is free to flow outward and be discharged through the spout 23. When the contents of the cup and tube have been discharged the flow will stop as the valve 31 prevents inflow of liquid through the draw off tube into the cup from below and there can be no inflow from above as the tube 18 extends above the level of the liquid.

On again closing the faucet the valve 31 is moved rearward opening the rear end of the draw off tube and permitting the cup 15 and tube 18 to be refilled.

The cup 15 may be made of any size desired.

Having thus described our invention what we claim is:—

1. In a measuring device for liquid dispensing apparatus comprising a liquid container and a reciprocating plug faucet for drawing off liquid therefrom, a draw off tube connected at its outer end with the faucet and having its open inner end within the liquid container, a measuring cup within the container carried by the draw off tube and in communication therewith, and a valve freely movable within the draw off tube and adapted to close said draw off tube when drawn into its end, means connected with the reciprocating plug of the faucet for moving the valve into and out of the inner end of the draw off tube comprising a rod supported at its rear end by the valve.

2. In a measuring device for liquid dispensing apparatus, a liquid container, a measuring cup having a valve tube extending therethrough and adapted to be placed within the liquid container, said valve tube extending through the wall of the liquid container and being joined to a reciprocating plug faucet, a valve operatively connected to the reciprocating plug of the faucet and arranged to move into and out of the inner end of the valve tube, and a vent tube for the measuring cup leading upward to above the level of the liquid in the liquid container.

3. In a measuring device for liquid dispensing apparatus, a liquid container, a measuring cup having a valve tube extending therethrough and adapted to be placed within the liquid container, said valve tube extending through the wall of the liquid container and being joined to a reciprocating plug faucet, a valve operatively connected to the reciprocating plug of the faucet and arranged to move into and out of the inner end of the valve tube, an extension lip on the end of the valve tube adapted to guide the valve into the tube, and a vent tube for the measuring cup leading upward to above the level of the liquid in the liquid container.

4. In a liquid dispensing apparatus, an ice container, a liquid container adapted to be placed within the ice container, a measuring cup having a valve tube extending therethrough and adapted to be placed within the liquid container, said valve tube extending through the walls of the liquid container and the ice container and being joined to a reciprocating plug faucet, a valve operatively connected to the reciprocating plug of the faucet and arranged to move into and out of the inner end of the valve tube, and a vent tube for the measuring cup leading upward to above the level of the liquid in the liquid container.

5. In a liquid dispensing apparatus, an ice container, a liquid container adapted to be placed within the ice container, a measuring cup having a valve tube extending therethrough and adapted to be placed within the liquid container, said valve tube extending through the walls of the liquid container and the ice container and being joined to a reciprocating plug faucet, a valve operatively connected to the reciprocating plug of the faucet and arranged to move into and out of the inner end of the valve tube, a vent tube for the measuring cup leading upward to above the level of the liquid in the liquid container, and means for supporting an inverted bottle on the liquid container so as to maintain a constant level of liquid in the container.

6. In a liquid dispensing apparatus, an ice container, a liquid container adapted to be placed within the ice container, a measuring cup having a valve tube extending therethrough and adapted to be placed within the liquid container, said valve tube extending through the walls of the liquid container and the ice container and being joined to a reciprocating plug faucet, a valve operatively connected to the reciprocating plug of the faucet and arranged to move into and out of the inner end of the valve tube, and a vent tube for the measuring cup leading upward to above the level of the liquid in the liquid container, and rubber gaskets encircling the valve tube for making water tight joints all arranged to be compressed by drawing tight the joint between the faucet and the valve tube.

In testimony whereof we hereunto affix our signatures.

GEORGE R. LONG.
HENRY G. CORDLEY.